(12) United States Patent
Verbakel et al.

(10) Patent No.: US 6,957,181 B1
(45) Date of Patent: Oct. 18, 2005

(54) TRANSFERRING COMPRESSED AUDIO VIA A PLAYBACK BUFFER

(75) Inventors: Johannes M. M. Verbakel, Eindhoven (NL); Josephus J. M. M. Geelen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/328,025

(22) Filed: Jun. 8, 1999

(30) Foreign Application Priority Data

Jun. 12, 1998  (EP) .................................. 98201978

(51) Int. Cl.[7] ............................................. G10L 19/00
(52) U.S. Cl. .................... 704/201; 704/501; 360/15; 360/32; 360/13; 369/47.33; 714/707
(58) Field of Search ................................ 704/200, 201, 704/500–504; 360/15, 32, 13; 369/47.33; 714/707; 725/126, 138

(56) References Cited

U.S. PATENT DOCUMENTS

| | | | | |
|---|---|---|---|---|
| 4,455,635 A | * | 6/1984 | Dieterich .................. | 369/47.17 |
| 4,841,574 A | * | 6/1989 | Pham et al. ................. | 704/201 |
| 5,508,940 A | * | 4/1996 | Rossmere et al. .......... | 345/723 |
| 5,568,495 A | * | 10/1996 | Laczko et al. ............... | 714/798 |
| 5,724,091 A | * | 3/1998 | Freeman et al. ............. | 725/138 |
| 5,845,239 A | * | 12/1998 | Laczko et al. ............... | 704/200 |
| 5,937,138 A | * | 8/1999 | Fukuda et al. ............... | 386/112 |
| 6,047,360 A | * | 4/2000 | Claar et al. .................. | 711/165 |
| 6,092,119 A | * | 7/2000 | Rossmere et al. ........... | 709/247 |
| 6,320,825 B1 | * | 11/2001 | Bruekers et al. ......... | 369/30.17 |
| 6,353,703 B1 | * | 3/2002 | Tatsumi et al. ............. | 386/104 |

OTHER PUBLICATIONS

"Improved Lossless Coding of 1-Bit Audio Signals", by F. Bruekers et al., Presented at the 103 AES Convention 1997, Sep. 26-29. Audio Engineering Society Preprint 4563 (I-6).

* cited by examiner

*Primary Examiner*—Vijay Chawan
(74) *Attorney, Agent, or Firm*—Michael E. Belk

(57) ABSTRACT

A method for transferring real time information on a record carrier, typically bitstream audio on an optical disc, which method comprises encoding consecutive segments of the real time information to compressed real time data in frames, and determining a buffer occupancy for at least one frame, which buffer occupancy is indicative of an amount of compressed real time data to be present in the playback buffer at the start of decoding said frame. A signal is transmitted carrying the compressed real time data and the buffer occupancy, which data are received, stored in a playback buffer and finally decoded. The retrieving and/or the decoding is controlled in dependence on said transferred buffer occupancy. A playback buffer can be used effectively without risk for underflow or overflow. Also a method for recording audio information on a record carrier, a recording device, a record carrier and a playback device are described.

19 Claims, 4 Drawing Sheets

Figure 1A:
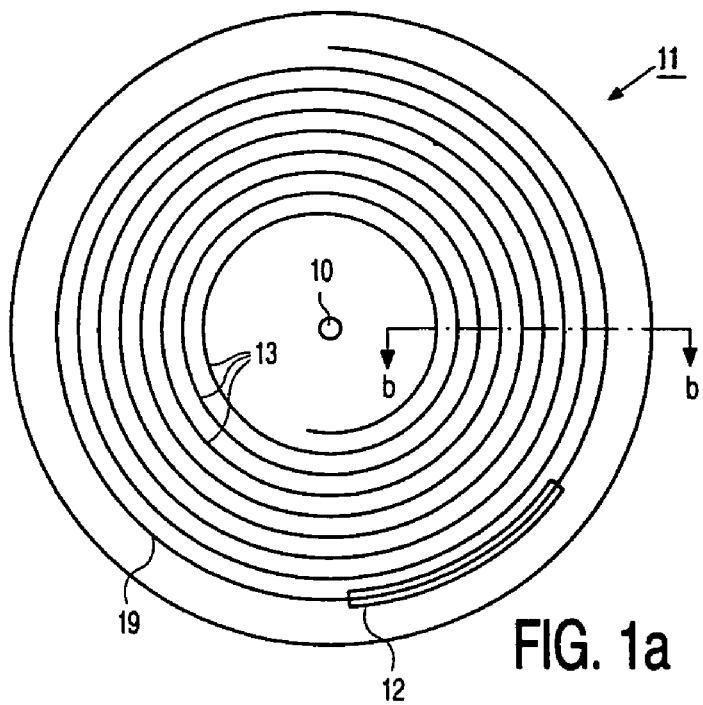

```
                                                        #bits
Frame_Info ( ) [ f ]    {

Time Code                                            24 if (Frame_Format == 0 /* == LLC */)
    {
        Reserved                                          2
        N_sectors [ f ]                                   4
        Buffer_Occupancy [ f ]                           18
    }
}
```

TRANSFERRING COMPRESSED AUDIO VIA A PLAYBACK BUFFER

The invention relates to a method for transferring real time information, in particular audio information, the method comprising the steps of encoding consecutive segments of the real time information to compressed real time data in frames, and transmitting a signal carrying the compressed real time data, receiving the signal and retrieving the compressed real time data, storing the received compressed real time data in a playback buffer, and decoding the compressed real time data from the playback buffer.

The invention further relates to a signal carrying real time information, in particular audio information, which real time information is encoded to compressed real time data in frames relating to consecutive segments of the real time information.

The invention further relates to a method for recording audio information on a record carrier, the method comprising the steps of encoding consecutive segments of the audio information to compressed audio data in frames, and recording the compressed audio data.

The invention further relates to a recording device for recording audio information on a record carrier, the device comprising compression means for encoding consecutive segments of the audio information to compressed audio data in frames, and recording means for recording the compressed audio data on the record carrier.

The invention further relates to a record carrier carrying audio information, which audio information is encoded to compressed audio data in frames relating to consecutive segments of the audio information.

The invention further relates to a playback device for retrieving audio information from the record carrier, which device comprises reading means for retrieving the compressed audio data from the record carrier, a playback buffer, and de-compression means for decoding frames of compressed audio data from the playback buffer to consecutive segments of the audio information.

Such a method for transferring real time information, in particular audio, is known from D1 in the list of related documents. D1 discloses a system for transferring audio information, in particular recording audio on a record carrier such as a disc or tape. Compression of the audio information, in particular lossless compression for a high audio quality level, is used to minimize the transfer rate required and to realize a high effective audio information density, i.e. the amount of audio information per unit of record carrier surface. After compression the data rate of the compressed audio data may vary, e.g. more bits are required to encode a complex segment of audio. However, the data rate of the transfer system is fixed or can vary only slowly. Hence a playback buffer is used in the player to compensate for fast variations and to reproduce a continuous audio signal after decompression. During reading the record carrier the retrieved compressed audio is passed to the playback buffer at said fixed (or slowly varying) rate. To prevent underflow and overflow the playback buffer has to be half full on average, to allow said fast variation of compressed audio data. The known method has the problem, that the playback buffer has to be large to allow an efficient compression of the audio.

It is an object of the invention to provide means for transferring real time information requiring less buffer space, while realizing a high effective information density.

For this purpose a method for transferring audio as described in the opening paragraph is characterized according to the invention in that the method comprises the steps of determining, before transmitting, a buffer occupancy for at least one frame, which buffer occupancy is indicative of an amount of compressed real time data to be present in the playback buffer at the start of decoding said frame, transferring the buffer occupancy via the signal, and controlling the retrieving and/or the decoding in dependence on said transferred buffer occupancy.

For this purpose a signal as described in the opening paragraph is characterized according to the invention in that the signal comprises a buffer occupancy for at least one frame, which buffer occupancy is indicative of an amount of compressed real time data to be present in a playback buffer at the start of decoding said frame.

For this purpose a recording method as described in the opening paragraph is characterized according to the invention in that the method comprises the steps of determining a buffer occupancy for at least one frame, which buffer occupancy is indicative of an amount of compressed audio data to be present in a playback buffer at the start of decoding said frame, and recording the buffer occupancy on the record carrier.

For this purpose a recording device as described in the opening paragraph is characterized according to the invention in that the device comprises determining means for determining a buffer occupancy for at least one frame, which buffer occupancy is indicative of an amount of compressed audio data to be present in a playback buffer at the start of decoding said frame, and in that the recording means are arranged for recording the buffer occupancy on the record carrier.

For this purpose a record carrier as described in the opening paragraph is characterized according to the invention in that the record carrier comprises a buffer occupancy for at least one frame, which buffer occupancy is indicative of an amount of compressed audio data to be present in a playback buffer at the start of decoding said frame.

For this purpose a playback device as described in the opening paragraph is characterized according to the invention in that the device comprises means for retrieving the buffer occupancy for at least one frame from the record carrier, and control means for controlling the reading means and/or the de-compression means in dependence on said retrieved buffer occupancy.

The above means according to the invention enable transferring of audio information via a signal or a record carrier as follows. The buffer occupancy is determined during encoding and therefore the amount of bufferspace required for a given transfer system at any time during decoding of an audio item is known. Via the record carrier the buffer occupancy for a frame is transferred to the playback device. The retrieving and decoding process can now be controlled in dependence of the buffer occupancy, e.g. decoding a frame is started when the amount of data in the playback buffer is substantially equal to the buffer occupancy of said frame. This has the advantage, that a playback buffer of a predetermined size can be employed to the limits of being substantially empty or full for compensating peaks and dips in the data rate of the compressed audio data without the risk of underflow or overflow. In the prior art a playback buffer was required of about twice said predetermined size to allow the same variations in data rate and which large buffer had to be half full when starting decoding. Using the smaller buffer and the buffer occupancy control according to the invention also has the advantage that reproducing the audio can be started with less delay after arrival of the corresponding compressed audio data.

This is especially advantageous for achieving a fast start of audio reproduction after a jump to a new target position on a record carrier. The invention is particularly suitable for a disc shaped record carrier of an optically readable type, such as CD.

The invention is especially relevant when a lossless compressor is applied for achieving impeccable audio quality at an acceptable audio information density. In a lossless compressor the resulting bitrate varies strongly with the audio content and there is no option to smooth peaks in view of possible overflow or underflow problems in the playback buffer by decreasing the amount of bits produced by increasing the compression rate, e.g. by temporarily lowering the objective picture quality as is used in MPEG video compression.

Further advantageous, preferred embodiments according to the invention are given in the dependent claims.

Figure 1B:
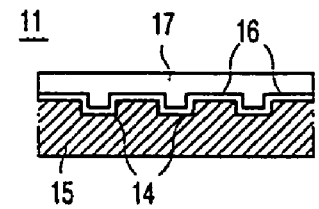
Figure 5:
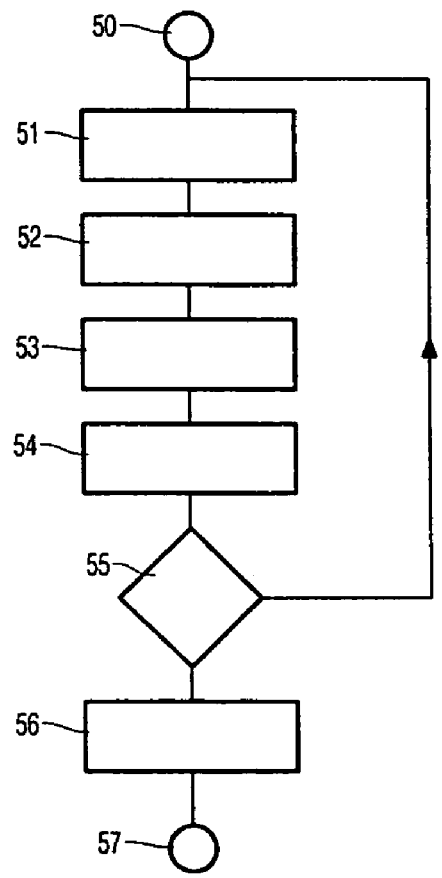
Figure 2:
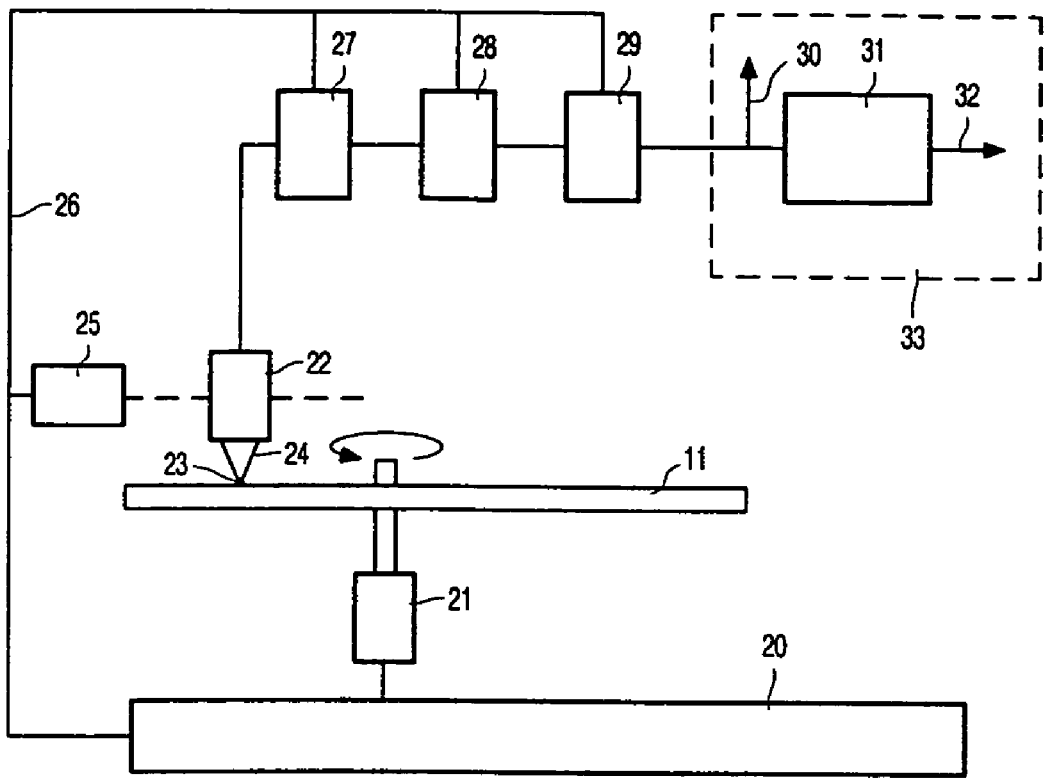
Figure 3:
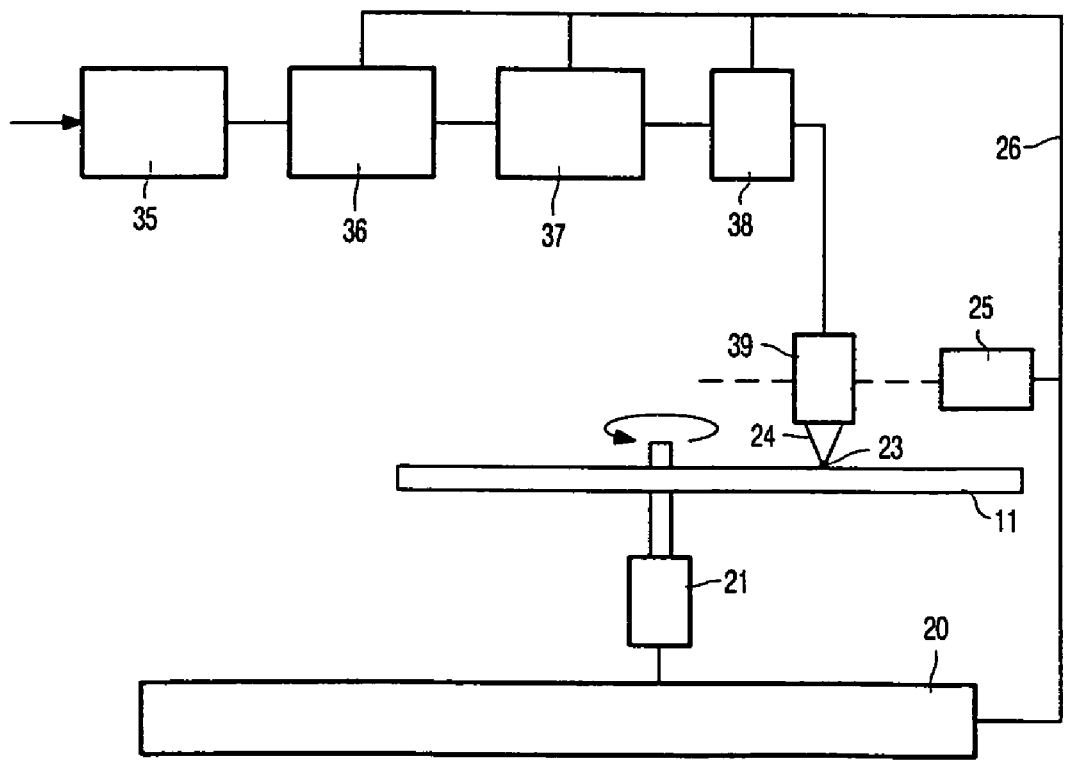
Figures 4, 6:
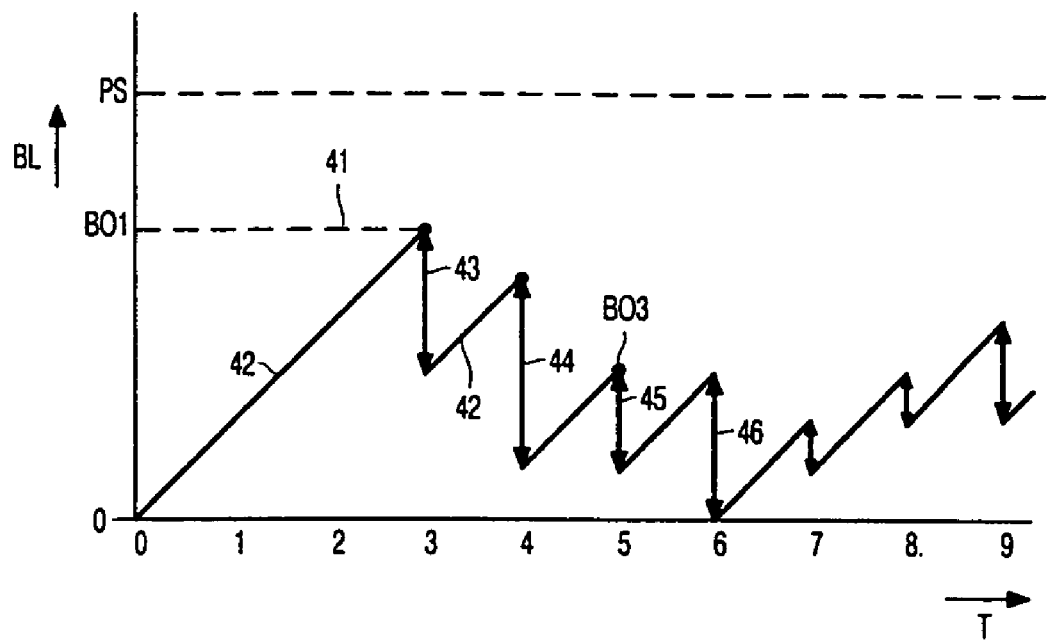
Figure 7:
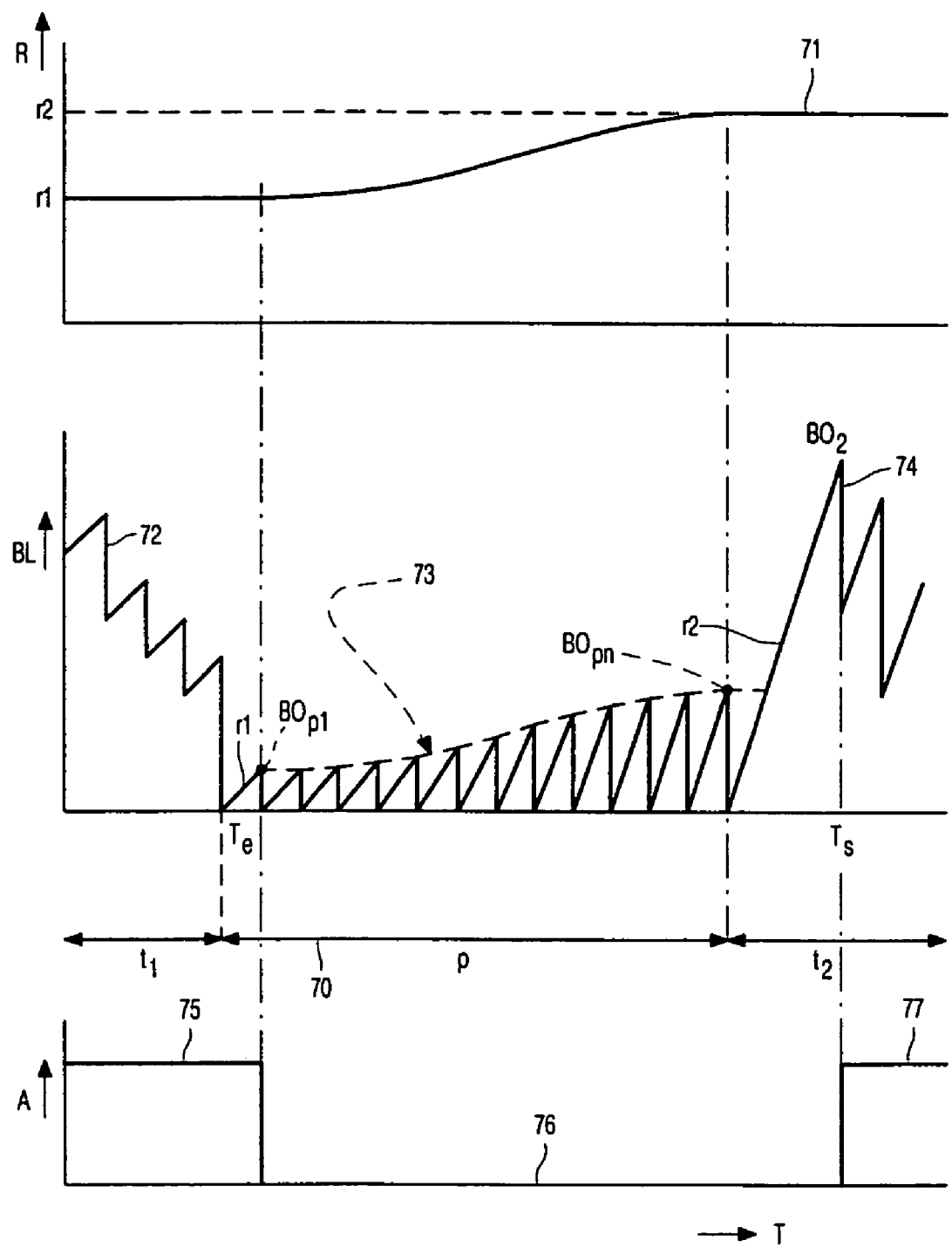

These and other aspects of the invention will be apparent from and elucidated further with reference to the embodiments described by way of example in the following description and with reference to the accompanying drawings, in which FIG. 1 shows a record carrier,
FIG. 2 shows a playback device,
FIG. 3 shows a recording device,
FIG. 4 shows the amount of data in the playback buffer,
FIG. 5 shows the recording process,
FIG. 6 shows frame control information, and
FIG. 7 shows a transfer speed change in a pause area.

Corresponding elements in different Figures have identical reference numerals.

FIG. 1a shows a disc-shaped record carrier 11 having a track 19 and a central hole 10. The track 19 is arranged in accordance with a spiral pattern of turns constituting substantially parallel tracks on an information layer. The record carrier may be an optical disc having an information layer of a recordable type or of a prerecorded type. Examples of a recordable disc are the CD-R and CD-RW, and the DVD-RAM, whereas the audio CD is an example of a prerecorded disc. The prerecorded type can be manufactured in a well known way by first recording a master disc and subsequently pressing consumer discs. The track 19 on the recordable type of record carrier is indicated by a pre-embossed track structure provided during manufacture of the blank record carrier. The track structure is constituted, for example, by a pregroove 14 which enables a read/write head to follow the track 19 during scanning. The information is represented on the information layer by optically detectable marks recorded along the track, e.g. pits and lands.

FIG. 1b is a cross-section taken along the line b—b of the record carrier 11 of the recordable type, in which a transparent substrate 15 is provided with a recording layer 16 and a protective layer 17. The pregroove 14 may be implemented as an indentation or an elevation, or as a material property deviating from its surroundings.

The record carrier carries audio information, which audio information is subdivided in items for the convenience of the user, the item being usually a few minutes in duration, e.g. songs on an album or movements of a symphony. Usually access information for identifying the items is also provided on the record carrier, e.g. in a so called Table Of Contents (TOC) or included in a file system like ISO 9660 for CD-ROM. The access information may include a playing time and a start address for each item, and also further information like a song title.

The audio information is recorded in a digital representation after analog to digital (A/D) conversion. Examples of A/D conversion are PCM 16 bit per sample at 44.1 kHz as known from CD audio and 1 bit Sigma Delta modulation at a high oversampling rate e.g. 64×Fs, usually called bitstream. Converting an audio signal into a 1-bit bitstream signal has a number of advantages. Bitstream conversion is a high quality encoding method, with the possibility of a high quality decoding or a low quality decoding with the further advantage of a simpler decoding circuit. Reference is made in this respect to the publications 'A digital decimating filter for analog-to-digital conversion of hi-fi audio signals', by J. J. van der Kam, document D5 in the list of related documents, and 'A higher order topology for interpolative modulators for oversampling A/D converters', by Kirk C. H. Chao et al, document D6 in the list of related documents.

After A/D conversion the digital audio is compressed to compressed audio data, which has a variable bitrate and is recorded on the information layer. Audio compression and de-compression of a suitable type is known. Audio is compressed after digitizing by analyzing the correlation in the signal, and producing parameters for fragments of a specified size. During de-compression an inverse process is applied to reconstruct the original signal. If the original, digitized signal is reconstructed exactly the (de-)compression is called lossless, whereas in lossy (de-)compression some details of the original signal are not reproduced, which omitted details are substantially undetectable by the human ear (eye). Known systems such as DCC or MPEG or as described in D4, use lossy compression for audio (and/or video), whereas lossless compression is known from storing computer data. Examples of lossless compression and decompression of high quality audio can be found in D1, D2, and D3 of the list of related documents. In the compression the audio information is subdivided in consecutive frames, each frame resulting in a varying amount of compressed audio data. The compressed audio data is to be read from the record carrier at such a speed that, after decompression, substantially the original timescale is restored when reproducing the audio information continuously. Hence the compressed data must be retrieved from the record carrier at a speed dependent on the varying bitrate, or the compression and recording must be adjusted to achieve a fixed bitrate, e.g. by using stuffing bits. The speed of retrieving data from the record carrier is called transfer speed, i.e. the speed of transferring data bytes from the record carrier to a de-compressor. Preferably the record carrier has a constant spatial data density, which gives the highest data storage capacity per record carrier. In such a system the transfer speed is proportional to the relative linear speed between the medium and the read/write head, and a constant transfer speed results in a varying rotation rate (Constant Linear Velocity system, CLV). A playback buffer is provided before the de-compressor and the transfer speed is the speed before that buffer.

According to the invention the record carrier comprises a buffer occupancy for at least one frame, and preferably for each frame or a regular pattern of frames, e.g. each fourth frame. The buffer occupancy is determined during recording and can be used to control the retrieval and decoding process in the playback device. The buffer occupancy indicates an amount of compressed audio data which is to be present in the playback buffer at the start of decoding the corresponding frame. A playback device reproducing an audio item, operating at a predetermined transfer speed and provided with a playback buffer of the predetermined size, controls the decoding process to start when the amount indicated by the buffer occupancy is present in the buffer. When starting at that moment, no underflow or overflow of the playback buffer will occur during the further decoding of the audio item, because during encoding, i.e. with full knowledge of the audio item, the buffer occupancy has been calculated for the further playing time of the taking into account the predetermined transfer speed and buffer size, and the amounts of compressed audio data of each frame.

FIG. 4 shows the amount of data in the playback buffer. The buffer level BL is given on the vertical axis and the predetermined size of the playback buffer is indicated by a dashed line at level PS. The time T is given on the horizontal axis in time units of one frame (e.g. 1/75 sec). The inflow of new data read from the record carrier arrives at a fixed data transfer speed, indicated by the slanting lines 42 between the frame decoding times. At T=3 the first frame is decoded, and the corresponding compressed audio data is taken from the playback buffer indicated by the vertical arrow 43. The audio frames have a fixed time duration (after decoding), so at T=4,5,6, . . . further frames 44,45,46 are decoded. During reproduction of a frame the playback buffer will be gradually filled with new retrieved data. According to the invention the start of decoding the first frame 43 has been postponed until T=3, at which time the buffer level reached the level indicated by the buffer occupancy BO1 of the first frame. If the decoding of the first frame had been started at T=2, an underflow would have occurred later at T=6 when decoding the fourth frame 46. A similar situation resulting in overflow could occur at a series of easily encodable frames, if decoding is started too late. Further frames may also have a buffer occupancy, e.g. BO3 given for the third frame 45. Preferably each frame has a buffer occupancy.

In an embodiment of the recording method the transfer speed is predetermined not as one fixed value, but as a range with a minimum and/or maximum allowed speed and/or a maximum rate of change of speed. The speed actually used at each instant of the recording may be indicated by a separate transfer speed profile as described in D7. The buffer occupancy is calculated taking into account the transfer speed set for the respective frame by the transfer speed profile.

In an embodiment of the record carrier a sequence of buffer occupancies is indicative of the transfer speed profile and can be used to control the reading speed as described below with reference to FIG. 2. In particular when two audio items, e.g. t1 and t2, require a different transfer speed, say r1 and r2 and r2>r1, the transfer speed profile for changing from r1 to r2 can be achieved as follows. The first option is to assign an area on the boundary of t1 and t2 as connecting area and gradually set the buffer occupancies of consecutive frames at a value calculated using a intermediate transfer speed between r1 and r2. The playback device will note at each frame that the actual buffer level is lower then the given buffer occupancy, and the playback device will increase its reading speed. In an alternative embodiment a pause area is included between said two audio items, and the buffer occupancy during the pause is set to increasing values, and compressed pause frames of a fixed size are used. A similar change in transfer speed is achieved when setting the buffer occupancy at a fixed value and increase the size of the pause frames, e.g. by adding an increasing amount of stuffing data. A combination of both increases is also possible. Said increase is calculated to correspond to a increase in transfer speed per unit of time, i.e. per frame duration. Using a pause area for changing the transfer speed has the advantage, that any change in reading speed (e.g. in rotation rate of a disc) is performed during a pause and during audio reproduction the transfer speed is constant. Hence the speed changes cannot be of any influence to the audio quality. Alternatively to adding a pause area each audio item may be provided itself with head and tail areas in which the transfer speed starts respectively ends at a standardized value. In the head area the transfer speed is increased (or decreased) from the standard speed to the speed required for the item. This has the advantage that audio items can be easily joined at the tail/head point for editing purposes, because the transfer speed is the standardised transfer speed at that point.

FIG. 7 shows the buffer occupancy for a transfer speed change. The time T is given on the horizontal axis, and the arrow 70 indicates transfer of a first audio item t1, followed by a pause p and a second audio item t2. The lower graph shows the reproduced audio A of the first item t1 by curve 75, the silence during the pause p by curve 76 and the audio of item t2 by curve 77. The middle graph shows the buffer level BL of the playback buffer during playback of said items. The first item is given by curve 72, which ends with an empty buffer at Te. The reproduction of second audio item t2 as indicated by curve 74 starts at Ts at a buffer level $BO_2$. The transfer speed for item t1 is r1, and for item t2 a higher speed r2 is used as shown by the slope of the playback buffer filling at r1 for curve 72 and at r2 for curve 74. In the pause area p no or little sound information is required (silent period curve 76). During the pause p each frame is defined so as to fully empty the playback buffer at an increasing amount per frame, starting at a value corresponding to r1 by $BO_{p1}$ and at the end of the pause reaching a value $BO_{pn}$ corresponding to r2. In response the transfer speed R gradually increases from r1 to r2, as shown in the upper graph by curve 71. The data used for constituting the pause frames can be stuffing data or other additional data, such as picture or text data, e.g. song title and performers.

FIG. 2 shows a playback apparatus according to the invention for reading a record carrier 11, which record carrier is identical to the record carrier shown in FIG. 1. The device is provided with drive means 21 for rotating the record carrier 1, and a read head 22 for scanning the track on the record carrier. The apparatus is provided with positioning means for coarsely positioning the read head 22 in the radial direction on the track. The read head comprises an optical system of a known type for generating a radiation beam 24 guided through optical elements focused to a radiation spot 23 on a track of the information layer of the record carrier. The radiation beam 24 is generated by a radiation source, e.g. a laser diode. The read head further comprises a focusing actuator for moving the focus of the radiation beam 24 along the optical axis of said beam and a tracking actuator for fine positioning of the spot 23 in a radial direction on the centre of the track. The tracking actuator may comprise coils for radially moving an optical element or may be arranged for changing the angle of a reflecting element. The radiation reflected by the information layer is detected by a detector of a usual type, e.g. a four-quadrant diode, in the read head 22 for generating a read signal and further detector signals including a tracking error and a focusing error signal coupled to said tracking and focusing actuators. The read signal is processed by a reading means 27 to retrieve the data, which reading means are of a usual type for example comprising a channel decoder and an error corrector. When operating the record carrier is rotated and the read head is positioned resulting in retrieving the data at a transfer speed. The retrieved data is passed to a data selection means 28. The data selection means selects the compressed audio data from all data read and passes the compressed audio data to playback buffer 29. The selection is based on data type indicators also recorded on the record carrier, e.g. headers in a framed format. The compressed audio data is passed on from the playback buffer 29 to a de-compressor 31 via signal 30. This signal may also be available as an output signal to an external de-compressor. The de-compressor 31 decodes the compressed audio data to reproduce the original audio information on output 32. It is to be noted, that the de-compressor may be fitted in a separate housing, e.g. in a stand-alone high quality audio digital to analog convertor (D/A convertor), as indicated by the dashed rectangle 33 in FIG. 2. It is to be noted, that alternatively a buffer may be positioned before the data selections means. The playback buffer 29 may also be positioned in the separate housing, or may be combined with a buffer in the decompressor. The device is further provided with a control unit 20 for receiving commands from a user or from a host computer for controlling the apparatus via control lines 26, e.g. a system bus, connected to the drive means 21, the positioning means 25, the reading means 27 and the data selection means 28, and to playback buffer 29 for buffer filling level control. To this end, the control unit 20 comprises control circuitry, for example a microprocessor, a program memory and control gates, for performing the procedures described below. The control unit 20 may alternatively be implemented as a state machine in logic circuits.

According to the invention the data selection means 28 are arranged for retrieving control information from the data read, in particular the buffer occupancy information. The data selection means 28 are also arranged to discard any stuffing data, which stuffing data are added during recording according to the required bitrate of the record carrier system. When the control unit 20 is commanded to reproduce an item of audio from the record carrier, the positioning means 25 are controlled to position the reading head on the portion of the track containing the TOC. The starting address for that item is retrieved from the TOC via the data selection means 28. Alternatively the contents of the TOC may be read once and stored in a memory when the disc is inserted in the apparatus.

To provide a continuous reproduction without playback buffer underflow or overflow filling level of the playback buffer is compared with the retrieved buffer occupancy. The decoding of a frame is started, when said comparison indicates that the filling level is substantially equal to the buffer occupancy. The buffer occupancy may be defined as the required level before or after removing the compressed audio data from the playback buffer.

In a different embodiment the playback device is provided with a playback buffer of a size larger than the maximum amount of data present in one winding of the track on a disc shaped record carrier. The disc is rotated at a speed substantially higher than the intended reading speed, e.g. as described for CLV above. When the playback buffer is full, the reading is halted the read head is moved radially backwards to a previous winding of the track (jumping back). The reading is resumed after at least one rotation of the disc, when space is available in the playback buffer. On average the required transfer speed is achieved by reading at said high speed and halting temporarily when the playback buffer is full. The buffer occupancy is read from the disc and the audio reproduction is started when the playback buffer contains at least the indicated amount of data, guaranteeing that no underflow will occur. Alternatively the process of jumping back can be controlled by using the buffer occupancy of the current and/or further frames already available from the data in the playback buffer. This information can be used inter alia to calculate when the reading has to be resumed.

In an embodiment of the playback device the speed of reading is controlled in dependence on the reproduction speed on the audio from the D/A convertor, i.e. to the bitrate after decompression. To this end the apparatus comprises a reference frequency source for controlling the output data rate. Hence the data rate of the uncompressed audio is fixed and the reading speed must be controlled to provide the corresponding amount of compressed audio data. Each time a buffer occupancy is available it is compared to the actual filling degree of the playback buffer. The difference is indicative of the required correction of the reading speed. The average of said differences may be used to adjust the reading speed, e.g. the rotation rate of a disc shaped record carrier or the transport speed of a tape. Preferably the playback buffer is somewhat larger than the predetermined size as required by the decoding system, e.g. an amount $\delta$, to allow temporary deviations from the optimal reading speed without a risk of underflow or overflow. The optimal buffer level is then given by the buffer occupancy added to a margin, e.g. $0.5*\delta$.

An embodiment of the system requires a playback device to adjust the reading speed within predetermined bounds, such as by a change of rotation speed of a disk shaped record carrier. The buffer occupancy can be used to transmit a speed adjustment, e.g. by using a higher transfer speed when calculating the buffer occupancy of the next frame the playback device will note an actual buffer level lower than the buffer occupancy and increase the reading speed.

In a different embodiment of the playback device the reading speed is controlled in discrete steps instead of a continuous range. Due to the discrete steps in available speed, the resulting speed value never results in a buffer level exactly as indicated by the buffer occupancy. So a speed slightly higher or lower results in growing surplus or deficit in the buffer level. The speed control mechanism is arranged to step up the speed as soon as the deficit is larger than a predetermined value, and/or to step down the speed as soon as the surplus is larger than a predetermined value. The predetermined values may be equal or one of them may be zero. The playback buffer has extra buffer space in addition to the above predetermined size, the extra buffer space having the size of the deficit and/or the surplus to allow the discrete variation of transfer speed.

FIG. 3 shows a recording device for writing information on a record carrier 11 according to the invention of a type which is (re)writable. During the writing operation, marks representing the information are formed on the record carrier. The marks may be in any optically readable form, e.g. in the form of areas with a reflection coefficient different from their surroundings, obtained when recording in materials such as dye, alloy or phase change, or in the form of areas with a direction of magnetization different from their surroundings, obtained when recording in magneto-optical material. Writing and reading of information for recording on optical disks and usable formatting, error correcting and channel coding rules are well-known in the art, e.g. from the CD system. The marks can be formed by means of a spot 23 generated on the recording layer via a beam 24 of electromagnetic radiation, usually from a laser diode. The recording device comprises similar basic elements as the apparatus for reading described above with FIG. 2, i.e. a control unit 20, a drive means 21 and a positioning means 25, but it has a write head 39. Audio information is presented on the input of compression means 35, which may be placed in a separate housing. Suitable compression means are described in D1, D2, D3 and D4. The variable bitrate compressed audio on the output of the compression means 35 are passed to a recording buffer 36. From the recording buffer 36 the data is passed to data combination means 37 for adding stuffing data and further control data. The total data stream to be recorded is passed to writing means 38. The write head 39 is coupled to the writing means 38, which comprise for example a formatter, an error coder and a channel coder. The data presented to the input of the writing means 38 is distributed over logical and physical sectors according to formatting and encoding rules and converted into a write signal for the write head 39. The control unit 20 is arranged for controlling the buffer 36, the data combination means 37 and the writing means 38 via control lines 26 and for performing the positioning procedure as described above for the reading apparatus. Alternatively the recording apparatus will also be arranged for reading having the features of the playback apparatus and a combined write/read head.

According to the invention the control unit 20 of the recording device is arranged for determining the buffer occupancy. The amount of compressed audio data generated for a series of frames is analyzed, and a buffer occupancy for the first frame of the series is chosen at a level such that during the series the maximum level does not overflow a playback buffer of a predetermined size, e.g. as defined in a standard for the playback device. Obviously also no underflow may occur. The recording device may use a recording buffer larger than the playback buffer for temporary storing said series, or the buffer occupancy may be determined separately in a recording method as described with reference to FIG. 5. In embodiments of the recording device the actual values for the buffer occupancy are calculated according to the transfer speed and/or transfer speed profiles as described above with reference to FIGS. 2, 4 and 7.

FIG. 5 shows a recording method to be performed by a recording apparatus according to the invention. After the start 50 of a recording session in a first step 51 the audio information in an item of audio information is encoded to compressed audio data having a variable bitrate. The compressed data is stored in an edit buffer of a sufficiently large size, which may be implemented by temporarily storing data on a further record carrier constituting a file to be recording later. In a second step 52 the buffer occupancy for the frames in the item is determined, based on the amount of compressed audio data and the peaks/valleys therein. The buffer occupancy calculation takes into account a predetermined size of the playback buffer, as illustrated above with FIG. 4. In a third step 53 stuffing data is added to the compressed audio data according to the required transfer speed to fill the excess data transfer capacity during said easy parts. In a fourth step 54 the data is recorded on the record carrier. The recording may be made in real time if the temporary store is a random access buffer, e.g. a RAM memory. The buffer must be substantially larger than the playback buffer, because the buffer occupancy can only be determined after at least a substantial part of the audio item has been encoded, and recording in real time can start only after at least the buffer occupancy at the beginning of the item has been determined. For real time recording the stuffing data may be added in real time during recording. Alternatively the item (or all items) are recorded not real time, but are first stored completely as a file in the edit buffer and recorded afterwards. The stuffing data and further control data may be added to the compressed audio data in that file, which file is usually called an image file. The transfer of the file from the edit buffer to the record carrier can be done at a constant and usually higher speed, e.g. as high as the recording system can handle. In a fifth step 55 after recording the item it is determined if that item was the last item. If not, the process is repeated from step 51, but after the last item in a sixth step 56 control information is recorded for all items, e.g. in a Table Of Contents, and a record carrier is available at the end 57.

FIG. 6 shows frame control information for a frame of compressed audio data. The compressed audio data for a frame is transferred via a signal or on a record carrier packaged in a transmission format, usually the compressed audio data is preceded by a header and multiplexed with other data. The (multiplexed) data stream is mapped on blocks or sectors for transfer in a usual manner. According to the invention frame control information is added to the frame, e.g. recorded in a header of the corresponding audio frame on the record carrier. The first item in the frame control information Frame_Info( )[f] for frame f is Time_Code, which indicates a playing time of the audio frame in 24 bits. The further frame control information is present only for Lossless coded frames, indicated by a system parameter Frame_Format=LLC. In that case, after 2 Reserved bits, the length of the compressed frame f is indicated by N_Sectors[f] in 4 bits. And finally the Buffer_Occupancy[f] is given in 18 bits.

Although the invention has been explained by embodiments using audio information, it will be clear the invention can be employed for storing any type of information having a real time character, which is to be compressed to variable bitrate data, such as video information. Moreover audio information can be stored in combination with other information, using the buffer occupancy according to the invention. Further, the invention lies in each and every novel feature or combination of features. For example the embodiments show a disc shaped record carrier, but the invention can be applied also to other record carriers of different shape, like a tape.

List of Related Documents
(D1) 'Improved Lossless Coding of 1-bit Audio Signals' by F. Bruekers et al. Presented at the 103rd AES Convention 1997 Sep. 26–29. Audio Engineering Society preprint 4563 (I-6)
(D2) PCT/IB97/01156 (PHN 16.452) 1 bit ADC and lossless compression of audio
(D3) PCT/IB97/01303 (PHN 16.405) Audio compressor
(D4) EP-A 402,973 (PHN 13.241) Audio compression
(D5) 'A digital decimating filter for analog-to-digital conversion of hi-fi audio signals', by J. J. van der Kam in Philips Techn. Rev. 42, no. 6/7, April 1986, pp. 230–8
(D6) 'A higher order topology for interpolative modulators for oversampling A/D converters', by Kirk C. H. Chao et al in IEEE Trans. on Circuits and Systems, Vol 37, no. 3, March 1990, pp. 309–18
(D7) EP 97203743.6 (co-pending application PHN 16.648, filing date 29 Nov. 1997) Transferring audio using a transfer speed profile

What is claimed is:
1. A method for transferring real time information, in particular audio information, the method comprising:
   encoding consecutive segments of the real time information to compressed real time data in frames,
   transmitting a signal carrying the compressed real time data,
   receiving the signal and retrieving the compressed real time data,
   storing the received compressed real time data in a playback buffer,
   decoding the compressed real time data from the playback buffer, determining, before transmitting, a buffer occupancy for at least one frame, which buffer occupancy is indicative of an amount of compressed real time data to be present in the playback buffer at the start of decoding said frame, transferring the buffer occupancy via the signal, controlling the retrieving and/or the decoding in dependence on said transferred buffer occupancy.

2. A signal carrying real time information, in particular audio information, which real time information is encoded to compressed real time data in frames relating to consecutive segments of the real time information, wherein the signal comprises a buffer occupancy for at least one frame, which buffer occupancy is indicative of an amount of compressed real time data to be present in a playback buffer at the start of decoding said frame.

3. A method for recording audio information on a record carrier, the method comprising:

encoding consecutive segments of the audio information to compressed audio data in frames, and recording the compressed audio data, determining a buffer occupancy for at least one frame, which buffer occupancy is indicative of an amount of compressed audio data to be present in a playback buffer at the start of decoding said frame, and recording the buffer occupancy on the record carrier.

4. The method of recording as claimed in claim 3, wherein the buffer occupancy is indicative of the amount of compressed audio data to be present in the playback buffer at the start of decoding said frame before the compressed audio data relating to said frame is removed from said buffer.

5. The method of recording as claimed in claim 3, wherein determining the buffer occupancy comprises the step of determining an amount of compressed audio data in a recording buffer before or after encoding said frame.

6. A playback device for retrieving audio information from a record carrier as claimed in claim 5, which device comprises a reader that is configured to retrieve the compressed audio data from the record carrier, a playback buffer, and a de-compression element that is configured to decode frames of compressed audio data from the playback buffer to consecutive segments of the audio information, an occupancy reader that is configured to retrieve the buffer occupancy for at least one frame from the record carrier, and a controller that is configured to control at least one of the reader and the de-compression element in dependence on-said the retrieved buffer occupancy.

7. The playback device as claimed in claim 6, wherein the controller is configured to control the de-compression element to start decoding a frame when the amount of compressed audio data in the playback buffer substantially corresponds to the buffer occupancy.

8. Playback device as claimed in claim 7, wherein the controller is configured to control the reader to adapt a speed of retrieving the compressed audio data from the record carrier in dependence on a difference between the buffer occupancy and the actual amount of compressed audio data present in the playback buffer at the start of decoding the frame.

9. Playback device as claimed in claim 6, wherein the controller is configured to control the reader to adapt a speed of retrieving the compressed audio data from the record carrier in dependence on a difference between the buffer occupancy and the actual amount of compressed audio data present in the playback buffer at the start of decoding the frame.

10. A recording device for recording audio information on a record carrier, the device comprising:

a compression element that is configured to encode consecutive segments of the audio information to compressed audio data in frames, and a recording element that is configured to record the compressed audio data on the record carrier, the device comprises an occupancy determinator that is configured to determine a buffer occupancy for at least one frame, which buffer occupancy is indicative of an amount of compressed audio data to be present in a playback buffer at the start of decoding the frame, and the recording element is configured to record the buffer occupancy on the record carrier.

11. The recording device as claimed in claim 10, wherein the device comprises a recording buffer, and the occupancy determinator is configured to determine the buffer occupancy in dependence on an amount of compressed audio data present in the recording buffer before or after encoding the frame.

12. A record carrier carrying audio information, which audio information is encoded to compressed audio data in frames relating to consecutive segments of the audio information, comprising a buffer occupancy for at least one frame, which buffer occupancy is indicative of an amount of compressed audio data to be present in a playback buffer at the start of decoding the frame.

13. The record carrier as claimed in claim 12, wherein the buffer occupancy is indicative of the amount of compressed audio data to be present in the playback buffer at the start of decoding said frame before the compressed audio data relating to said frame is removed from the playback buffer.

14. The record carrier as claimed in claim 13, wherein the record carrier comprises frame information for at least one frame, which frame information is located in a header area associated with said frame, and which frame information comprises the buffer occupancy.

15. The record carrier as claimed in claim 14, wherein the record carrier comprises a pause area between two audio items, in which pause area a series of buffer occupancies is indicative for a change in transfer speed from a first transfer speed at the end of the preceding audio item to a second transfer speed at the start of the following audio item.

16. The record carrier as claimed in claim 13, wherein the record carrier comprises a pause area between two audio items, in which pause area a series of buffer occupancies is indicative for a change in transfer speed from a first transfer speed at the end of the preceding audio item to a second transfer speed at the start of the following audio item.

17. The record carrier as claimed in claim 12, wherein the record carrier comprises frame information for at least one frame, which frame information is located in a header area associated with said frame, and which frame information comprises the buffer occupancy.

18. The record carrier as claimed in claim 17, wherein the record carrier comprises a pause area between two audio items, in which pause area a series of buffer occupancies is indicative for a change in transfer speed from a first transfer speed at the end of the preceding audio items to a second transfer speed at the start of the following audio item.

19. The record carrier as claimed in claim 12, wherein the record carrier comprises a pause area between two audio items, in which pause area a series of buffer occupancies is indicative for a change in transfer speed from a first transfer speed at the end of the preceding audio item to a second transfer speed at the start of the following audio item.

\* \* \* \* \*